United States Patent [19]

Stackhouse

[11] Patent Number: 4,525,793
[45] Date of Patent: Jun. 25, 1985

[54] VOICE-RESPONSIVE MOBILE STATUS UNIT

[75] Inventor: Bill L. Stackhouse, Charlottesville, Va.

[73] Assignee: General Electric Company, Lynchburg, Va.

[21] Appl. No.: 631,017

[22] Filed: Jul. 17, 1984

Related U.S. Application Data

[63] Continuation of Ser. No. 337,762, Jan. 7, 1982, abandoned.

[51] Int. Cl.³ ............................................. G10L 1/00
[52] U.S. Cl. .................................... 364/513.5; 381/36
[58] Field of Search ................. 364/513.5; 381/36, 41, 381/43, 51

[56] References Cited

U.S. PATENT DOCUMENTS 4,348,550   9/1982   Pirz et al. ............................... 381/43

OTHER PUBLICATIONS

Flanagan, "Computers that Talk and Listen", Proc. IEEE, Apr. 1976, pp. 405-415.

Primary Examiner—E. S. Matt Kemeny
Attorney, Agent, or Firm—Cushman, Darby & Cushman

[57] ABSTRACT

A voice-responsive mobile status unit for operation in a communication system having at least one mobile transceiver and at least one base transceiver is disclosed. A speech recognition circuit is provided for receiving and converting predetermined spoken phrases into corresponding coded outgoing digital data signals if a predetermined spoken message occurs within a predetermined time interval after the occurrence of a predetermined spoken keyword. The digital data signals are transmitted to the base transceiver by the mobile transceiver. The mobile status unit further has a speech synthesizer for receiving coded incoming digital data signals being transmitted by the base transceiver and received by the mobile transceiver. The speech synthesizer converts the incoming, coded, digital data signals into electrical signals representative of speech.

5 Claims, 6 Drawing Figures

VOICE-RESPONSIVE MOBILE STATUS UNIT

This is a continuation of application Ser. No. 337,762, filed Jan. 7, 1982, now abandoned.

BACKGROUND OF THE INVENTION

The present invention is related generally to radio transceivers and more particularly to such transceivers that are voice-responsive.

Radio transceivers capable of receiving and transmitting radio messages directly in response to human voice or speech are well known in the prior art. Such prior art radio transceivers are used in a wide range of applications including their use by police, medical, fire or other emergency personnel. When utilized by such emergency personnel, it is often desirable for a base station or other central location to constantly be appraised of the status of the emergency personnel, e.g., responding to call, at scene, etc. Prior art mobile status units which provide this function must be mounted near the vehicle operator. Mounting is difficult because the units are somewhat bulky and require space in the immediate area of the operator in the operator compartment. The ideal location is in the middle of the operator's line-of-sight. However, this is rarely possible since the operator typically has other functions to perform, such as driving.

Prior art mobile status units require the operator to depress buttons and look at indicators and switches to initiate the proper sequences. Panel indicators implemented with LED components are difficult to see in the daytime, especially in direct sunlight. Indicators implemented with liquid crystal displays are difficult to see at night and have difficulty in operating over the required temperature range. The panel switches can be back lit or placed adjacent to the appropriate indicator and must be sealed thereby increasing the cost of the mobile status unit. The switch area and the distance between switches must be such that a person with a large gloved hand can easily operate the switches. Because of these conflicting requirements prior art mobile status units are typically the result of engineering trade-offs.

The problem of properly locating radio transceivers has been addressed by the prior art. See, for example, U.S. Pat. No. 4,032,844 to Imazeki. Disclosed therein is a combination microphone, loudspeaker, and control unit which is adapted to be coupled by a multiconductor cable to a radio transceiver which is capable of transmitting and receiving a plurality of radio signals. The multiconductor cable is secured to a housing for the unit and is adapted to electrically connect the unit to the radio transceiver. The control unit provides the necessary control functions such that the radio transceiver may be located in any convenient location, even locations outside of the operator compartment.

U.S. Pat. No. 4,153,877 to Fathauer et al is for a mobile CB transceiver having the circuitry partitioned so as to permit the chassis housing the receiver circuitry, transmitter circuitry and frequency synthesizer circuitry to be installed in a remote location in a motor vehicle, such as behind the dashboard, under the seat or in the trunk so as to reduce the possibility of theft and/or the likelihood that the chassis could cause injury to the occupants of the vehicle in the event of an accident or sudden stop. All of the control circuitry is housed in a combination microphone and control unit adapted to be held in the hand of the operator of the vehicle and operated by the same hand which is holding the combination unit.

Another approach found in the prior art is to make some of the control functions controllable by spoken phrases thereby eliminating the need for manual adjustments. Such prior art radio transceivers partially responsive to voice commands typically provide for the switching of the transceiver between the transmit and the receive modes. See for example U.S. Pat. Nos. 3,169,221 to A. J. Franchi; 4,103,105 to Akiyama et al; 4,166,978 to White; and 4,178,548 to Thompson.

One type of transceiver totally controlled in its operational modes by voice commands is disclosed in commonly assigned U.S. patent application Ser. No. 343,754 filed concurrently herewith. Disclosed therein is a voice-controlled operator-interacting radio transceiver capable of performing a plurality of control operations such as turning the transceiver on and off, switching the transceiver from a transmit to a receive mode, changing the operating frequency of the transceiver, etc., in response to voice commands thereby eliminating the need for hands-on operation by the operator.

Sound-control of machines other than radio transceivers is also known. In U.S. Pat. No. 4,275,266 to Lasar a device for controlling machines by voice is disclosed which responds to a plurality of predetermined musical tones in a sequence to generate a digital control output signal. In an article entitled "Experimental Telephone Lets Disabled Dial By Voice", Bell Lab (USA), Volume 51, No. 9, an experimental telephone for physically handicapped people unable to hold a telephone handset or dial a conventional phone is described. The telephone will respond to any sound, even whistling, blowing, or tapping, above a certain threshold. The user must then turn on the phone's circuitry by entering an access code before entering the phone number.

In an article titled "Voice Data Entry Computer Terminal Allows User To Select 900-Word Vocabulary" found in Digital Technology Review "USA", Volume 17, No. 6, an intelligent voice terminal is disclosed which enables operators to enter data directly into a computer in familiar English language by speaking into a microphone or telephone handset. The system may be expanded to provide audio response to a voice synthesizer unit. The heart of the intelligent voice terminal is an acoustic pattern classifier that produces a digital code in response to a received utterance. An action structure associating an appropriate system action with each command that is recognized is also available. Actions may range from simply outputting a code associated with a recognized word to executing a complex computer program that is a function of several previously input commands. Another article discussing the voice-input of data is found in EDN, May 27, 1981, pages 101-113 by Edward R. Teja.

SUMMARY OF THE PRESENT INVENTION

The present invention is for a voice-responsive mobile status unit for operation in a communication system having at least one mobile transceiver and a base transceiver. A speech recognition circuit is provided for receiving and converting each of plural predetermined spoken phrases into a corresponding coded outgoing digital data signal. The speech recognition circuit is responsive to and activated by a key word. The key word is then followed by a phrase representative of the status of the operator. The phrase is accepted only if it follows the keyword occurrence within a predetermined time window which may be termed a "valid message phrase time window". The resulting coded outgoing digital data signal, if any, is input to the mobile transceiver for transmission to the base transceiver.

A speech synthesizer circuit is provided so that the mobile status unit is also operable to relay information in the opposite direction. The mobile transceiver receives coded incoming digital data signals which are input to the speech synthesizer. The speech synthesizer circuit converts the coded incoming data signals into electrical impulses representative of speech.

DESCRIPTION OF THE PREFERRED EMBODIMENT

Figure 1:
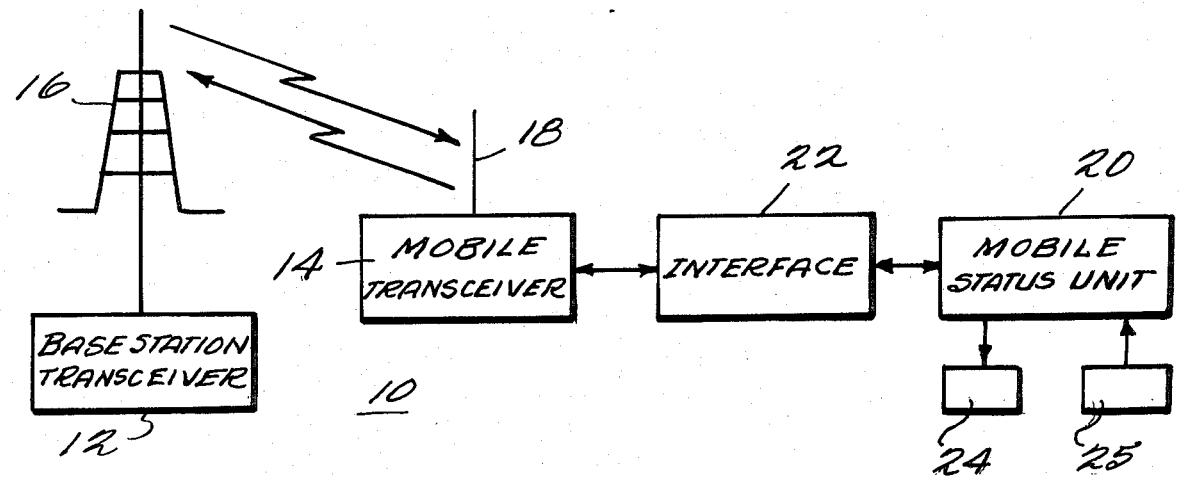
FIG. 1 is a block diagram illustrating a communication system utilizing a mobile status unit.

In FIG. 1, a communication system 10 having a base station transceiver 12 and a mobile transceiver 14 is illustrated. The base station transceiver 12 transmits and receives information at predetermined radio frequencies through a tower 16 or the like. The mobile transceiver 14 is also capable of transmitting and receiving information at predetermined radio frequencies through an antenna 18 or the like. The base station transceiver 12 and the mobile transceiver 14 may be set to operate at the same predetermined radio frequency thereby facilitating communications therebetween. It is anticipated that the communication system 10 may include a plurality of mobile transceivers 14.

The equipment located at the mobile location includes, in addition to the mobile transceiver 14, a mobile status unit 20 and an interface unit 22. The mobile status unit 20 inputs information to, and receives information from, the mobile transceiver 14 through the interface unit 22. A speaker 24 is responsive to information transmitted by the base station transceiver 12 and received by the mobile transceiver 14. A microphone 25 is provided so that the operator may transmit information from the mobile transceiver 14 intended for the base station transceiver 12. Information is transmitted in digital form between the base station transceiver 12 and the mobile transceiver 14. Since digital transmissions take less time than voice transmissions, time compression is achieved. The mobile status unit 20 is constructed so as to be operable in response to verbal commands. Because of this, no hand or eye contact is required in order to operate the mobile status unit and transmit status information or messages to the base station transceiver 12. Since the mobile status unit 20 does not need to be seen or touched by the operator, it can be remotely located in a position outside the operator compartment.

Figure 2:
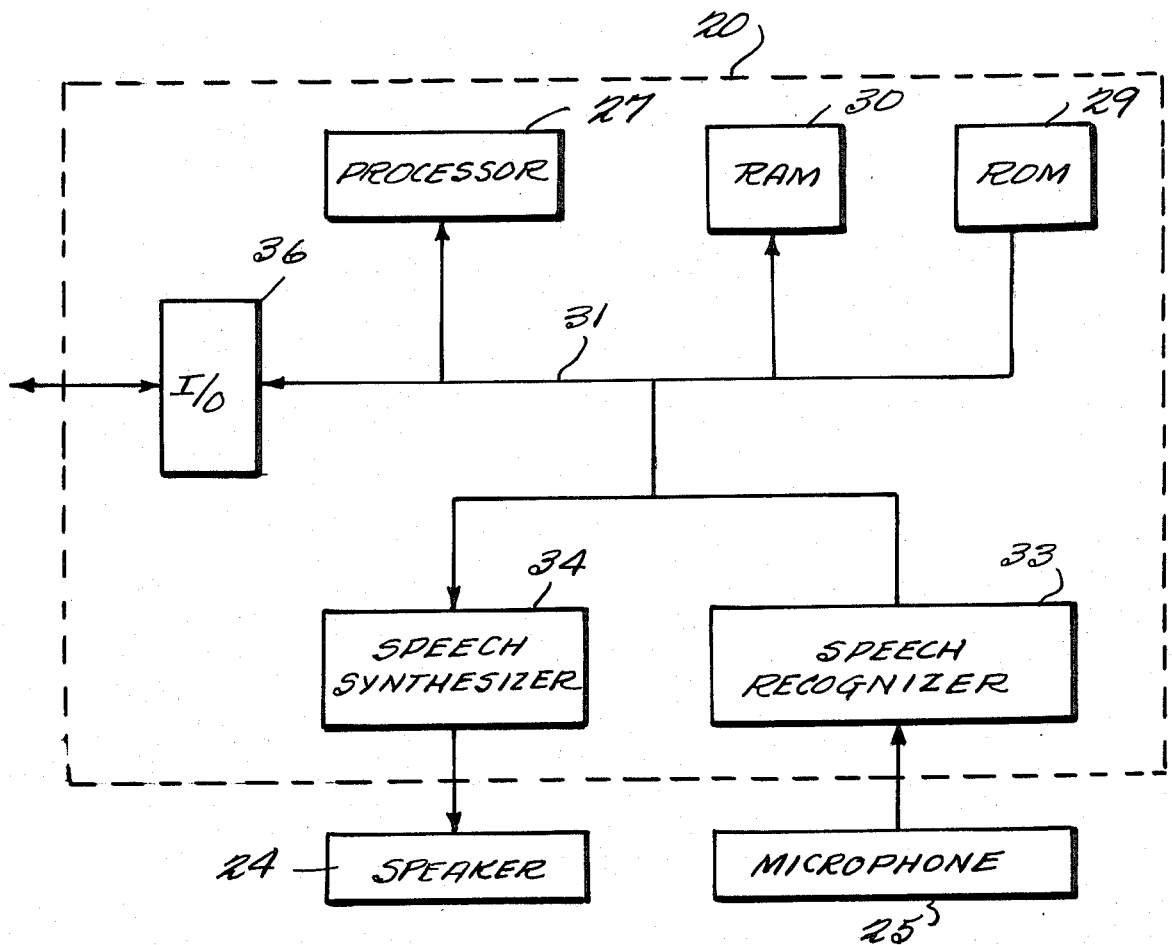
FIG. 2 is a block diagram illustrating a mobile status unit constructed according to the teachings of the present invention.

Turning to FIG. 2, a block diagram illustrating the mobile status unit 20 is illustrated. The heart of the mobile status unit 20 is a conventional data processor 27 which may be a Motorola 6802 or Intel 8085. The processor 20 operates according to preprogrammed instructions stored in a read only memory (ROM) 29 in a conventional manner. A random access memory (RAM) 30 is included so as to provide memory for temporary storage. The read only memory 29 can be any commercially available memory having approximately four kilo-bytes of memory while the random access memory may be any commercially available memory having approximately two kilo-bytes of memory. The random access memory 30 and the read only memory 29 are connected to the processor 27 by a bus 31 in a conventional manner. The bus 31 typically includes a data bus, an address bus and a control bus.

Figure 3:
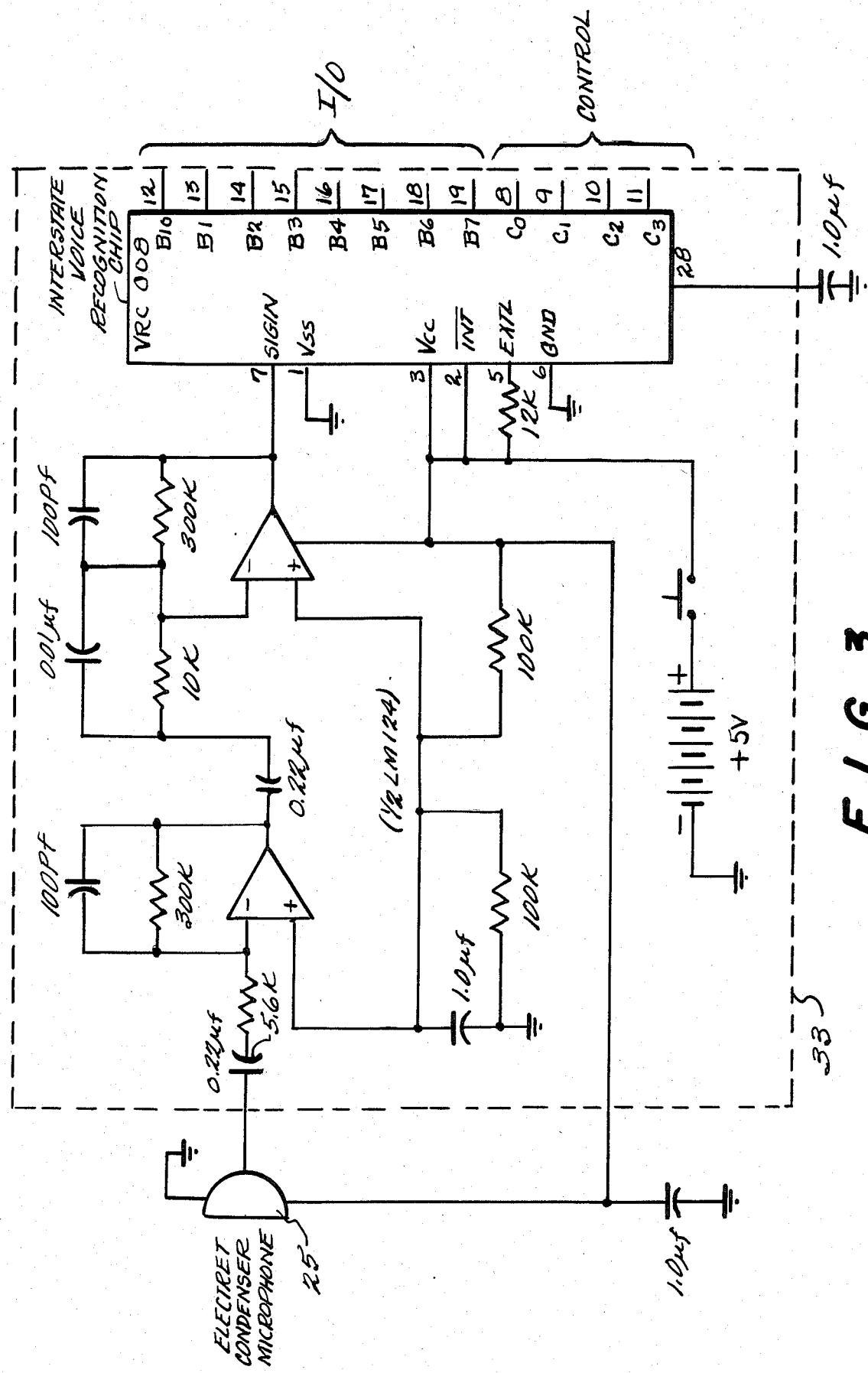
FIG. 3 is an electrical schematic illustrating the speech recognizer of FIG. 2.

A speech recognizer 33 such as a Model Auricle 1 produced by Threshold Technology of 20823 Steven Creek Boulevard, Cupertine, Calif. 95014, is connected to the processor 27 through the bus 31. The speech recognizer 33 may alternatively be a voice recognition chip with associated components such as a model VRC008, a voice recognition chip set such as a model VRC100-1 or a voice recognition module such as a model VRQ400, all of which are available from Interstate Electronics Corporation, Voice Products Operations, P.O. Box 3117, Anaheim, Calif. FIG. 3 illustrates one embodiment of the speech recognizer 33 comprised of the aforementioned model VRC008 and associated components. The speech recognizer 33 is responsive to electrical impulses received from the microphone 25. The microphone 25 is a conventional transducer producing electrical impulses responsive to spoken words.

The speech recognizer 33 is controlled by the processor 27. The speech recognizer 33 may be programmed so as to be responsive to certain key words such as: status, message, call, request, next, hello, etc. The speech recognizer 33 must recognize a predetermined key word so as to verify that the subsequently spoken phrases are valid. The phrases which the speech recognizer 33 may recognize as valid messages after receipt of a predetermined key word may include phrases such as: base, supervisor, data, clear, on assignment, at scene, in service, court, absent, break, lunch, etc. Additionally, programming of the speech recognizer 33 may be simplified by assigning a predetermined code word to each phrase. It can be seen that the speech recognizer 33 can operate with only a very limited vocabulary of approximately twenty to forty words or phrases to accomplish a complete status unit function. These words and phrases are easily encoded in one eight bit byte by the microprocessor which represents the word or phrase for the digital data transmission between the mobile transceiver 14 and the base station transceiver 12.

The mobile status unit 20 has a speech synthesizer 34 such as a Speech 1000 synthesizer board provided by Telesensory Speech Systems of 3408 Hill View Ave., Post Office Box 10099, Palo Alto, Calif. 94304, which is also connected to the processor 27 through the bus 31. The speech synthesizer 34 may alternatively be a voice responsive module, model number VTM150, available from the aforementioned Interstate Electronics Corporation, a TMS5100 four-bit synthesizer, a TMS5200 eight-bit synthesizer, or other commercially available speech synthesizer chips. The speech synthesizer 34 produces electrical signals which are input to the speaker 24. The speaker 24 is a conventional speaker which produces audible spoken phrases in response to the electrical signals produced by the speech synthesizer 34. The speech synthesizer 34 may be programmed so as to produce the following spoken phrases: accepted, call, base, supervisor, request, status, repeat, message, etc. Digital transmission received by the mobile transceiver 14 representative of one eight-bit byte of information can be easily decoded so as to produce the necessary spoken phrases. The mobile status unit 20 additionally has a conventional input/output port 36 for interfacing with the interface unit 22.

In operation, the mobile status unit 20 of FIG. 1 is responsive to certain, predetermined spoken key words. When the speech recognizer 33 recognizes a predetermined key word, the microprocessor 27 is prepared to receive a valid message. The message is coded into a digital outgoing communication signal which is transmitted from the mobile transceiver 14 to the base station transceiver 12. The base station transceiver 12 receives the coded outgoing communication signal and produces an analog signal responsive thereto. This analog signal contains the message information indicating the status of the operator. In this manner, the status of the operator is transmitted to the base station transceiver 12 using a minimum of communication channel time and without requiring the operator to perform any manual functions or to even look at the mobile transceiver 14.

In a similar fashion, the base station transceiver 12 produces coded, digital incoming data signals. The mobile transceiver 14 receives the coded, digital, incoming data signals which are input to the mobile status unit 20. The speech synthesizer 34 of the mobile status unit 20 produces an audible output signal responsive to the coded, digital incoming data signal. Thus, the operator may receive information without performing any manual functions or even having to look at the mobile transceiver 14.

Figure 4:
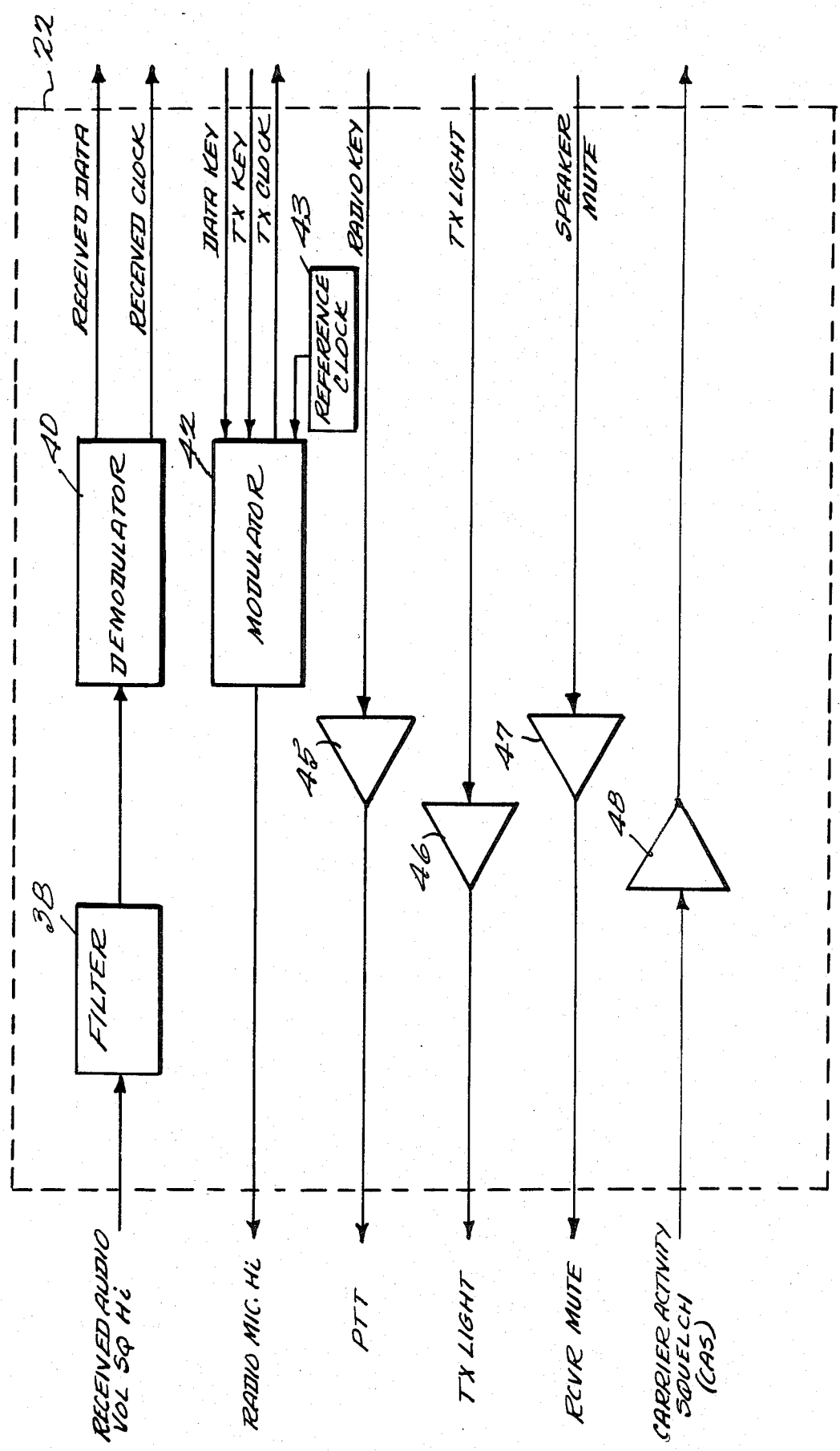
FIG. 4 is a block diagram illustrating in detail the interface unit shown in FIG. 1.

The interface unit 22 of FIG. 1 is illustrated in detail in FIG. 4. Coded, incoming digital data signals received by the mobile transceiver 14 are input to a filter 38 which improves the signal-to-noise ratio of the received signal. The filtered signal is then input to a demodulator 40. The demodulator outputs a received data signal and a received clock signal to the mobile status unit 20.

For information flowing in the opposite direction, a modulator 42 receives the data to be transmitted as well as a data key signal. The modulator 42 additionally receives a reference clock signal from a reference clock 43 and produces the coded, outgoing, digital data signal which is input to the mobile transceiver 14 for transmission to the base station 12. The modulator 42 also outputs a transmission clock signal to the mobile status unit 20. Additionally, a push-to-talk button and a transmission light on the mobile transceiver 14 are activated by a radio key signal and a transmission light signal produced by the mobile status unit 20 and input to the mobile transceiver 14 through amplifiers 45 and 46, respectively.

Additional functions which may be performed by the interface unit 22 include muting the speaker of the mobile transceiver 14 by inputting a speaker mute signal to the mobile transceiver 14 through an amplifier 47 and inputting a carrier activity squelch signal to the mobile status unit 20 through an amplifier 48. In summary, the interface unit 22 couples data signals and control signals produced by the mobile status unit 20 to the appropriate circuitry of the mobile transceiver 14 and couples data signals and control signals produced by the mobile transceiver 14 to the mobile status unit 20. The operation of the mobile status unit 20 is discussed in further detail in conjunction with FIGS. 5 and 6 hereinbelow.

Figure 5:
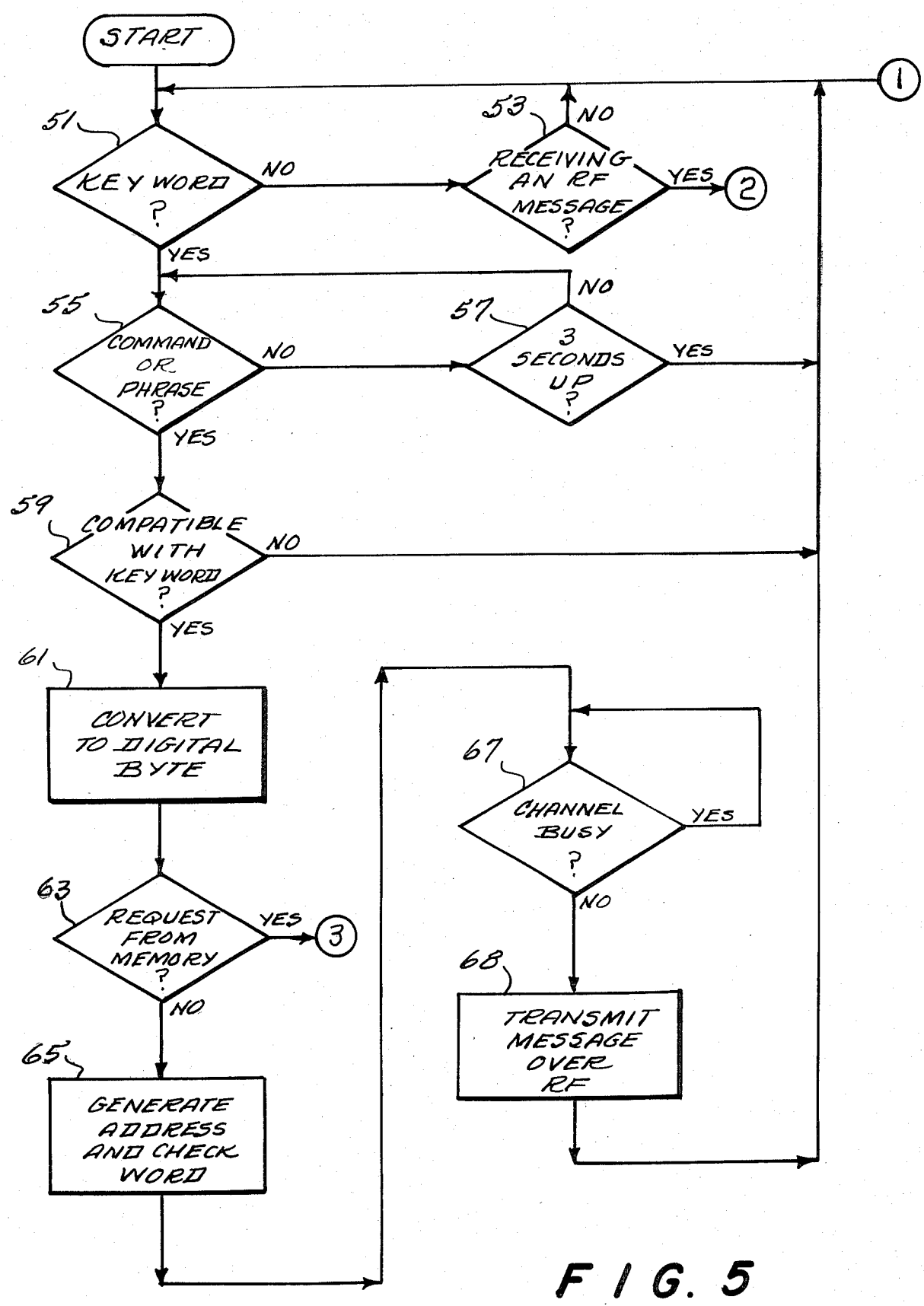
FIGS. 5 and 6 are flow charts illustrating a programmed sequence of operation for the mobile status unit illustrated in FIG. 2.

In FIG. 5, a flow chart associated with the programmed operation of the speech recognizer 33 is illustrated. The flow chart illustrated in FIG. 5 outlines the program instructions carried out by the processor 27 in response to a program stored in the read only memory 29. After initialization, the processor 27 determines at decision step 51 if a key word has been recognized. If no key word is recognized, the processor 27 determines, at decision step 53, if a radio frequency message is being received. If no such message is being received, the processor 27 returns to decision step 51. The processor 27 remains in this loop until either a key word is recognized or a radio frequency message is received. From decision step 51, after the recognition of a key word, the processor 27 determines if a phrase or command has been received at decision step 55. If the received information is neither a recognized command or phrase, the processor 27 waits for a predetermined valid message phrase time window, such as three seconds as illustrated by decision step 57. Decision step 57 allows the operator three seconds to provide a command or phrase after speaking a key word. If a command or phrase is not given after three seconds, the processor 27 returns to decision step 51. In this case, the operator will have to speak a new key word or repeat the previous key word in order to activate the mobile status unit 20. The processor 27, as conditioned by programmed steps 55–57 stored in ROM 29, thus provides a "valid message recognition means" which is operative during the valid message phrase time window.

After a command or phrase has been recognized, the processor 27 determines at decision step 59 whether the command or phrase is compatible with the recognized key word. If not, the processor 27 returns to decision step 51. If the command or phrase is compatible with the key word, the processor 27 converts the information to a digital byte. At decision step 63, the processor 27 determines if a request from memory has been made. If no request from memory has been made, the processor 27, at step 65, generates an address and a check word which is added to the digital byte to produce a coded, outgoing digital data signal. When the processor 27 has determined at decision step 67 that the communication channel is open, the processor 27 directs the mobile transceiver 14 to transmit the coded, outgoing digital data signal at step 68. Upon completion of transmission of the coded, outgoing data signal, the processor 27 returns to decision step 51.

Figure 6:
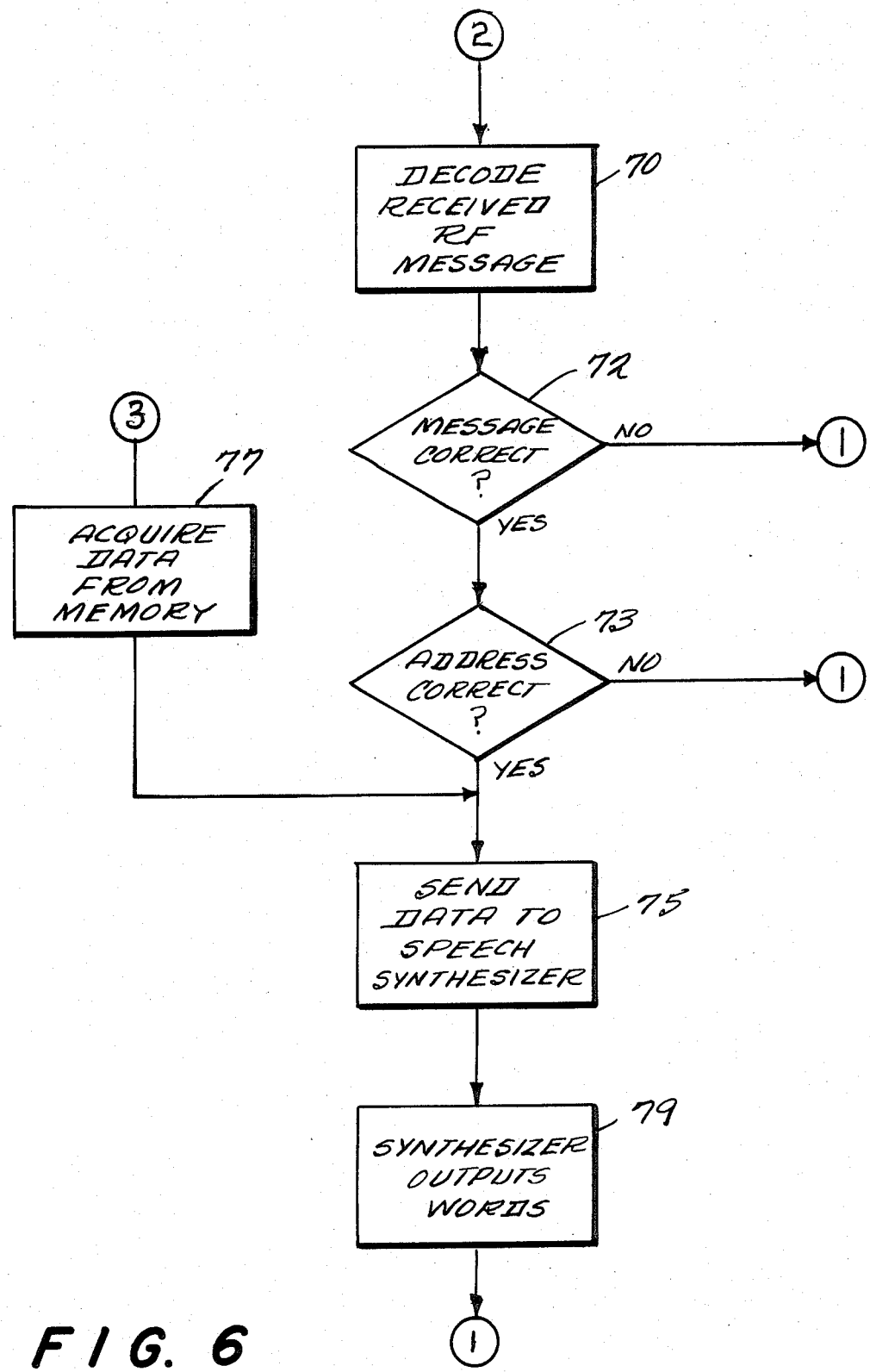

If a radio frequency signal has been received as determined by decision step 53, the processor 27 proceeds to step 70 illustrated in FIG. 6. FIG. 6 illustrates generally the programmed operation of the speech synthesizer 34. At step 70, the processor 27 decodes the received, coded, incoming, digital data signal. The decoded signal is checked at decision steps 72 and 73 to determine if an intelligible message has been sent to the correct address. If either test is failed, the processor returns to decision step 51. If both tests are passed, the processor 27 proceeds to step 75 wherein the received and decoded data is sent to the speech synthesizer 34. The processor 27 may also arrive at step 75 if at decision step 63 a request from memory has been made. In this case, the processor 27 acquires the necessary data from the memory as indicated by step 77 and sends that data to the speech synthesizer at step 75. The speech synthesizer 34 synthesizes the necessary output words at step 79 in response to the data sent thereto by the processor 27. After completion of synthesizing the output words, the processor 27 returns to decision step 51. This concludes the description of the programming flow chart illustrated in FIGS. 5 and 6.

Briefly reviewing, a mobile status unit is disclosed which is capable of producing coded, digital, outgoing data signals in response to recognized key words and phrases. This information is transmitted in a digital format to a base station transceiver through a mobile transceiver such that the status of the operator is recorded at the base station without the need of the operator for performing any manual functions. The mobile status unit is further capable of producing spoken words and phrases in response to coded, incoming, digital data signals such that the operator is made aware of the status of his message or other information transmitted by the base station transceiver.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

It is understood that appropriate address and error checking data are appended to the various data transmissions as required in the application of this unit.

What is claimed is:

1. A voice responsive mobile status unit for use in an r.f. communication system having r.f. communication links between mobile and fixed base stations, said mobile status unit being associated with at least one of said mobile stations and comprising:
   (A) a mobile r.f. transceiver capable of sending and receiving digitized data signals via an r.f. communication link;
   (B) speech recognition means capable (1) of receiving analog speech signals, (2) of recognizing any one of a predetermined set of speech phrases from analysis of said analog speech signals, and (3) of producing a corresponding one of a predetermined set of digital data signals in response to such recognition; and
   (C) control means connected to said mobile r.f. transceiver and to said speech recognition means for causing transmission of a predetermined digital data message signal over said r.f. communication link in response to the digital outputs of said speech recognition means;
   said control means including:
      (i) keyword recognition means for recognizing one of a predetermined subset of said digital data signals as an acceptable keyword and for initiating a valid message phrase time window in response to such recognition; and
      (ii) valid message recognition means, which is operative during said valid message phrase time window, (1) to recognize one of a predetermined subset of said digital data signals as a valid message for the particular just-recognized keyboard which initiated the current time window and (2) to permit transmission of said digital data message signal only in the event such a valid message phrase is recognized as having occurred within said time window.

2. A voice responsive mobile status unit as in claim 1 further comprising:
   (D) speech synthesizer means also connected to said control means and to said mobile r.f. transceiver for
      (1) accepting received digital data message signals from said r.f. communication link, for comparing such received digital message signals to a predetermined set of possibly valid such signals and, if a valid received digital data message signal is thus detected, (3) for converting same to a corresponding predetermined phrase of audible speech.

3. A voice-controlled mobile status unit for operation in an r.f. communication system having at least one mobile r.f. communication unit and a fixed base r.f. communication unit, said mobile status unit comprising:
   (A) a mobile r.f. transceiver;
   (B) speech recognition means for receiving and converting a predetermined spoken phrase, which phrase corresponds to one of a predetermined prestored set of spoken phrases including predetermined keywords, into a corresponding one of a predetermined set of coded digital data, said digital data
      (i) being representative of a corresponding one of a predetermined set of messages prestored in the base r.f. communication unit, and also
      (ii) being input to said mobile r.f. transceiver and digitally transmitted over the communication channel to said base r.f. communication unit only in the event a proper keyword-phrase has first been recognized within a predetermined prior time period; and
   (C) speech synthesizer means connected to said mobile r.f. transceiver for
      (i) receiving predetermined coded digital data transmitted over the communication channel by said base r.f. communication unit;
      (ii) matching said predetermined coded digital data to one of a predetermined set of prestored phrase data in said mobile status unit;
      (iii) converting said prestored phrase data into analog electrical signals which are transduced to corresponding acoustically audible speech.

4. The voice controlled mobile status unit of claim 3 including a common data processing means for controlling the operation of both the speech recognition means and the speech synthesizer means.

5. A method for voice controlled operation of a mobile status unit in a communication system having at least one mobile r.f. communication unit and a base r.f. communication unit, said method comprising:
   (A) receiving and converting a predetermined spoken phrase, which phrase corresponds one of a predetermined prestored set of spoken phrases, into a corresponding one of a predetermined set of coded digital data, said digital data
      (i) being representative of a corresponding one of a predetermined set of messages prestored in the base r.f. communication unit, and also
      (ii) being input to said mobile r.f. transceiver and digitally transmitted over the commmunciation channel to said base r.f. communication unit;
   (B) receiving predetermined coded digital data transmitted over the communication channel by said base R.F. communication unit;
   (C) matching said predetermined coded digital data to one of a predetermined set of prestored phrase data in said mobile status unit;
   (D) converting said matched prestored phrase data into analog electrical signals which are transduced to corresponding acoustically audible speech; and
   wherein the predetermined spoken phrases received and converted include both a key word and a message phrase and wherein the transmission of message phrase data occurs only in the event a proper key word phrase has first been recognized within a predetermined prior time period.

* * * * *